United States Patent [19]

Taylor

[11] Patent Number: 4,725,076
[45] Date of Patent: Feb. 16, 1988

[54] OCCUPANT RESTRAINING HEAD REST AND SEAT BELT

[75] Inventor: Edward F. Taylor, Farmington Hills, Mich.

[73] Assignee: General Motors Corporation, Detroit, Mich.

[21] Appl. No.: 899,871

[22] Filed: Aug. 25, 1986

[51] Int. Cl.⁴ .................. B60R 21/02; B60R 21/10
[52] U.S. Cl. .................................. 280/808; 297/395
[58] Field of Search .............. 280/801, 807, 808; 297/61, 391, 395, 468, 474, 483, 410

[56] References Cited

U.S. PATENT DOCUMENTS

| | | | |
|---|---|---|---|
| 3,311,413 | 3/1967 | Martens | 297/410 |
| 3,810,657 | 5/1974 | Campbell | 280/808 |
| 3,829,123 | 8/1974 | Holka | 280/808 |
| 3,946,788 | 6/1976 | Kmetyko | 297/395 |
| 4,249,754 | 2/1981 | Best | 297/395 |
| 4,285,545 | 8/1981 | Protze | 297/483 |
| 4,433,858 | 2/1984 | Taylor et al. | 280/802 |
| 4,568,107 | 2/1986 | Biviano | 280/808 |
| 4,621,835 | 11/1986 | Edwards | 280/808 |
| 4,645,234 | 2/1987 | Koide | 280/808 |

Primary Examiner—Richard A. Bertsch
Attorney, Agent, or Firm—Charles E. Leahy

[57] ABSTRACT

A vehicle head rest is pivotally mounted on the vehicle roof. An occupant seat belt includes a shoulder belt having its upper end connected to the head rest so that lockup of the retractor locks the shoulder belt to tether the head rest at an occupant restraining position. The upper end of the shoulder belt may pass slidably through the head rest and have its end attached to the seat so that the occupant restraining load imposed on the seat belt is divided between the head rest and the seat. In addition, spiral spring may have an upper end wound around the pivot axis of the head rest, and intermediate portion extending slidably through the head rest and a lower end attached to the seat backs so that fore and aft adjusting movement of the seat winds and unwinds the spiral spring which in turn adjusts the head rest forwardly and rearwardly in coordination with the seat.

5 Claims, 4 Drawing Figures

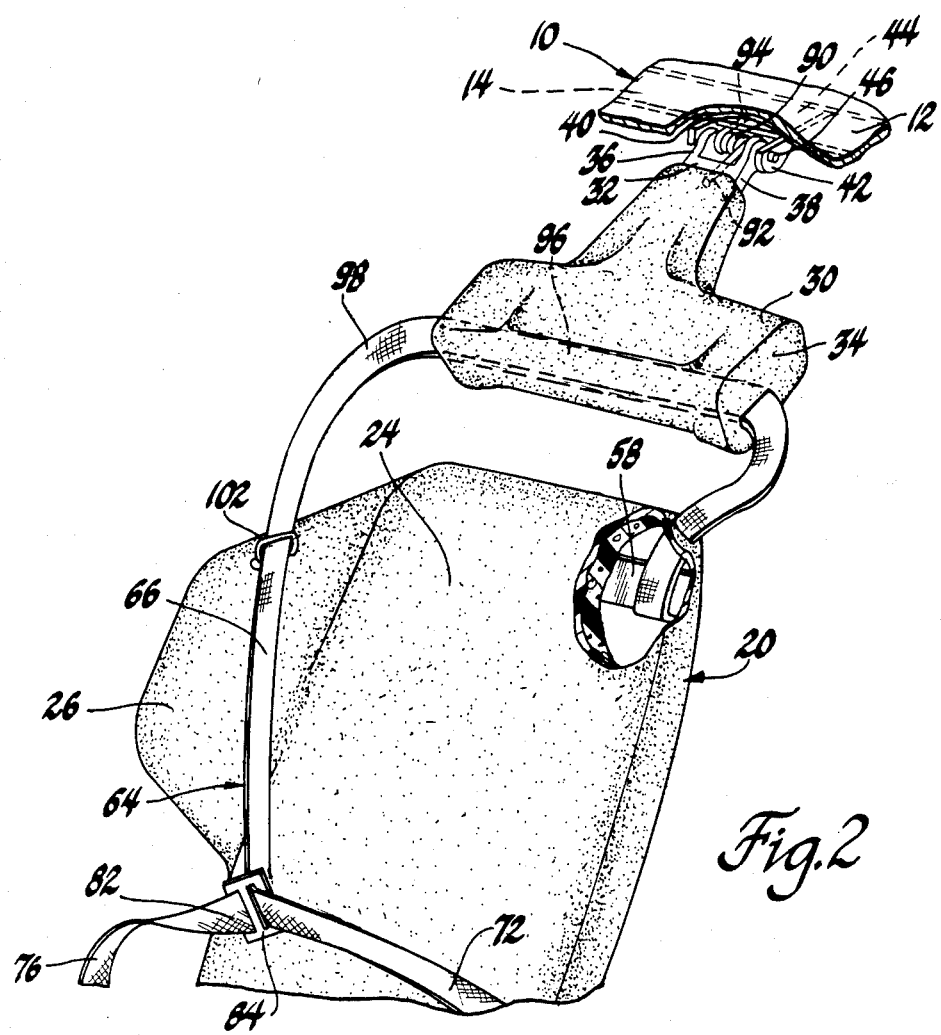
Fig. 2
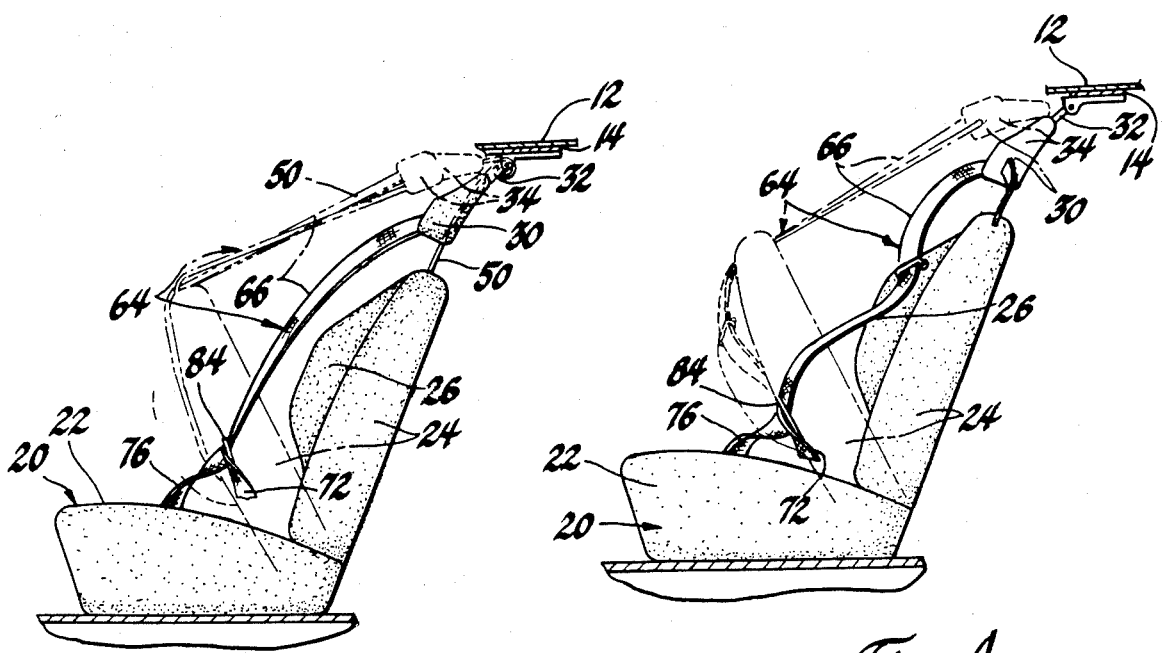
Fig. 3
Fig. 4

OCCUPANT RESTRAINING HEAD REST AND SEAT BELT

The invention relates to an occupant restraint and more particularly provides a roof mounted head rest operably connected with a vehicle seat for adjusting movement in response to movement of a seat.

BACKGROUND OF THE INVENTION

It is well known in motor vehicles to restrain the occupant's head via a head rest. Such a head rest may be integral with the vehicle seat, or the head rest may be suitably mounted on the vehicle roof structure.

It is also known to restrain the occupant by a restraining seat belt which may include a lap belt and a shoulder belt. The shoulder belt conventionally has an upper end mounted on one side of the occupant torso and the lower end suitably mounted on the vehicle body or the seat at the other side of the occupant torso so that the shoulder belt is deployed diagonally across the upper torso of the seat occupant. In the prior art the upper end of the shoulder belt has been proposed for mounting either on the roof, the door pillar, or on the seat itself. The disadvantage of mounting the upper shoulder belt on the seat is that the seat back must be strengthened to withstand the occupant restraint load imposed thereon.

It has been recognized in the prior art that the head rest should be adjustable fore and aft and/or up and down in response to adjusting movement of the seat so that the head rest is optimally positioned with respect to the occupant.

SUMMARY OF THE INVENTION

The present invention provides a new and improved operable association between the seat, the seat belt and a head rest which is pivotally mounted on the vehicle roof. Such a head rest has a frame covered by a cushion. The head rest frame includes a bracket which is pivotally connected with a mounting bracket suitably attached on a structural member of the vehicle roof.

In one embodiment of the invention the head rest is connected to the seat by a spiral spring having an inner end spiraled around the axis of the head rest pivot, an intermediate portion passing slidably through the head rest, and an outer end attached to the upper end of the seat. Accordingly, upon forward and rear movement of the seat, the spiral spring is wound and unwound from the head rest pivot axis and induces pivotal movement of the head rest forwardly or rearwardly upon corresponding movement of the seat to establish the head rest at an adjusted location appropriate to the location of the seat.

In conjunction with this connection between the head rest and the seat, it is desirable to mount the upper end of the shoulder belt on the head rest. Accordingly, lockup of the lower end of the shoulder belt by an inertia stimulus fixes the length of the shoulder belt so that the shoulder belt in turn tethers the head rest against pivoting movement relative to the roof by the occupant restraining load imposed on the head rest.

In another embodiment of the invention, the connecting means between the head rest and the seat is provided solely by the shoulder belt which has its upper end attached to the head rest so that the forward and rearward movement of the seat moves the occupant forward and rearward which in turn establishes the fore and aft position of the shoulder belt at its point of contact with the occupant's upper torso. The shoulder belt upper end preferably enters the head rest at one lateral end, passes slidably through the head rest and then has its end attached to the seat back. In this way the occupant restraint load imposed on the shoulder belt is divided between a downward acting force on the head rest and an upward lifting force on the seat back.

Accordingly, the object, feature and advantage of the invention resides in the provision of an operable connection between a roof mounted pivotal head rest and a fore and aft adjustable seat in order to adjust the fore and aft position of the head rest into a position corresponding with the adjusted position of the vehicle seat.

Another feature, object and advantage resides in the provision of a head rest pivotally mounted on the vehicle roof and operably connected to the seat by a seat belt so that forward tilting movement of the seat to enable entry into the rear seat automatically pivots the head rest forwardly to facilitate occupant ingress.

BRIEF DESCRIPTION OF THE DRAWINGS

These and other features, objects and advantages of the invention will become apparent upon consideration of the specification and appended drawings in which:

FIG. 2 is a fragmentary view similar to FIG. 1 but showing a second embodiment of the invention; and FIG. 3 is a side elevation view of the vehicle seat of FIG. 1 showing the seat back tilted forward to enable occupant access to the rear seat.

FIG. 4 is a view similar to FIG. 3 but showing the vehicle seat of FIG. 2 tilted forward to enable occupant access to the rear seat.

DESCRIPTION OF THE PREFERRED EMBODIMENT

Figure 1:
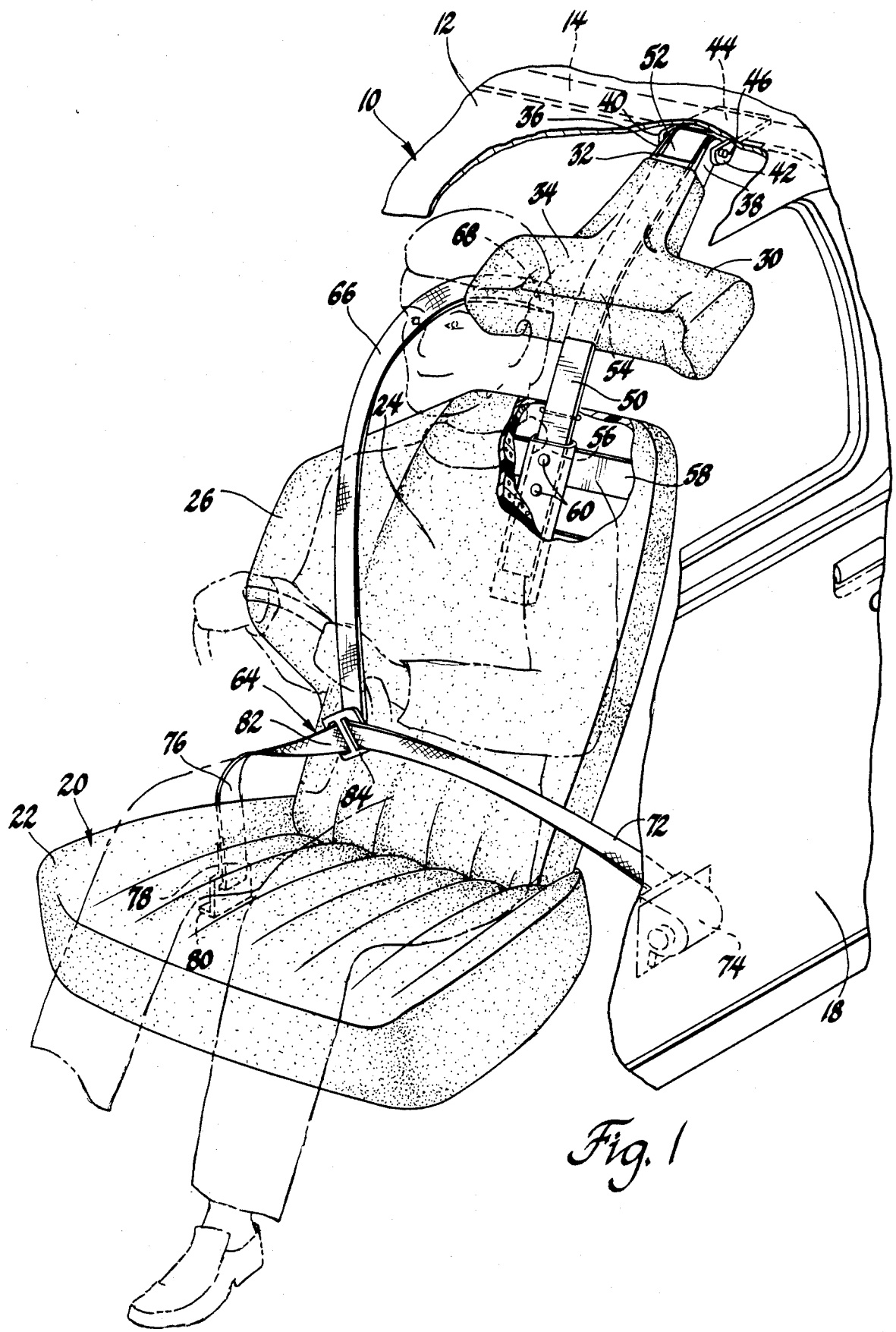
FIG. 1 is a perspective view of a motor vehicle occupant compartment showing a vehicle seat and associated seat belt and head rest, according to the invention.

Referring to FIG. 1, there is shown a vehicle body 10 having a roof 12 supported in part by a structural member 14. Vehicle body 10 defines an occupant compartment accessible through a door 18 which is hingedly mounted on the vehicle body 10 for swinging movement between the closed position of FIG. 1 and an outwardly pivoted open position, not shown. An occupant seat 20 is mounted within the occupant compartment of the motor vehicle and conventionally includes a seat bottom 22 and a seat back 24. The seat back 24 has a wing 26. The seat 20 is conventionally mounted on the floor of the vehicle body by a seat adjuster, not shown. The seat adjuster permits the seat 20 to be adjusted fore and aft to comfortably position the vehicle occupant with respect to the steering wheel and other vehicle controls. Referring again to FIG. 1, it is seen that a head rest 30 is provided for restraining the occupant's head. The head rest 30 includes a stamped metal frame 32 which is covered by a cushion 34. The frame 32 includes a bracket having pivot arms 36 and 38 which are interleaved with similar pivot arms 40 and 42 of a mounting bracket 44 welded or otherwise attached on the structural member 14 of the vehicle roof 12. A pivot pin 46 extends through aligned apertures in the bracket ears 36 and 38 of the head rest frame 32 and bracket ears 40 and 42 of the mounting bracket 44. Accordingly, the head rest 30 is pivotally mounted on the roof for arcuate movement in a manner which moves the head rest cushion 34 forwardly and rearwardly.

Referring again to FIG. 1, the head rest 30 is connected to the seat back 24 by a spiral spring 50 which may be fabricated of a plastic or metal material. The spiral spring 50 includes an inner end 52 which is anchored upon the pivot pin 46 and winds in a succession of coils about the pivot pin. The spiral spring 50 also includes an intermediate portion 54 which extends slidably through a clearance slot in the head rest 30. The lower end 56 of the spiral spring is attached to the frame member 58 of the seat back 24 by a pair of rivets 60.

The vehicle is also equipped with a seat belt system, generally indicated at 64. The seat belt system 64 includes a shoulder belt 66 having an upper end 68 suitably attached to the laterally inboard end of the head rest frame 32. The shoulder belt 66 also includes a lower end 72 which is mounted on the vehicle door by a seat belt retractor 74. In addition, the seat belt system 64 includes a lap belt 76 having an inboard end 78 which is attached to the vehicle floor by a mounting bracket 80 and an outboard end 82 which is slidably connected to the shoulder belt 66 by a slip ring 84. As shown in FIG. 1, with the door closed, the shoulder belt 66 is retractably wound by the door mounted retractor 74 so that the shoulder belt 66 assumes a diagonal position across the upper torso of the seat occupant. At the same time, the lap belt 76 is established at a generally horizontal position across the occupant's lap for restraining the occupant's lower torso.

When the door is pushed to the open position, the shoulder belt 66 is unwound from the retractor 74 and the outward and forward swinging movement of the retractor 74 with the door causes the shoulder belt 66 and the lap belt 76 to be positioned forwardly of the seat to facilitate occupant ingress and egress.

As seen in FIG. 1, the normal pivotal position of the head rest 30 with respect to its pivot axis defined by the pivot pin 46 is determined by the spiral spring 50. While the upper spiral end 52 is effectively anchored by the pivot pin and the lower end 56 is attached to the seat back, the intermediate portion 54 of the seat belt which passes slidably through the shoulder belt establishes the fore and aft pivotal position of the head rest. When the seat is adjusted forwardly, the spiral spring is unwound somewhat from its upper spiral end and the head rest 30 is pivoted somewhat forwardly as the lower end 56 travels forwardly with the seat back 24. Upon rearward adjusting movement of the seat, the spiral spring 50 rewinds onto its upper coiled end as the lower end 56 returns rearwardly so that the head rest 30 will be pivoted somewhat rearwardly.

In the event that the vehicle experiences an inertia stimulus of predetermined magnitude, the shoulder belt retractor 74 is locked so that the effective length of the shoulder belt 66 is fixed and thereby restrains the vehicle occupant. Concomitantly, this fixed length of the shoulder belt 66 effectively tethers the head rest 30 in order to establish its pivotal position at the proper and appropriate adjusted position with respect to the seat back. During actual restraint of the occupant, the shoulder belt 66 will induce a further limited rotational movement of the head rest as permitted by a yielding of the spiral spring 50.

Referring to FIG. 3, it is seen that the seat back 24 may be tilted forwardly to a phantom-line indicated position facilitating access to a rear seat. The spiral spring 50 is fully unwound from the pivot pin 46 during such pivoting movement and the intermediate portion 54 functions to pivot the head rest 30 to the full forward position of FIG. 3 to facilitate access to the rear seat.

DESCRIPTION OF A SECOND EMBODIMENT OF THE INVENTION

Referring to FIG. 2, there is shown an alternative embodiment of the invention. The head rest 30 is constructed and mounted similarly to the head rest of FIG. 1 and is accordingly identified by like reference numerals 30, 32, 34, 36, 38, 40, 44 and 46. A coil torsion spring 90 surrounds the pivot pin 46 and has one end 92 extending forwardly to engage the frame 32 of the head rest and another leg 94 extending rearwardly to engage the roof structure. The torsion spring 90 preferably operates to establish the head rest at a desired neutral pivotal position, perhaps midway within the range of permissible pivotal movement. The head rest 30 has a transversely extending slot 96 therethrough which slidably receives the upper end 98 of the shoulder belt 66. The upper end 98 of the shoulder belt 66 extends through the transverse slot 96 of the head rest 30 and is attached to the frame 58 of the seat back 24. In operation, it will be understood that forward and rearward movement of the seat will induce a forward and rearward movement of the shoulder belt which will in turn induce a corresponding forward and rearward pivotal movement of the head rest 30. Furthermore, it will be understood that upon the imposition of an occupant restraining load on the shoulder belt 66, the shoulder belt 66 will function to tether the head rest 30 at its appropriately obtained pivoted position. In addition, it will be appreciated that the passage of the shoulder belt 66 through the transverse slot 96 of the head rest 30 and coupled with the anchoring of the shoulder belt and onto the frame 56 of the seat back 24 will result in the occupant restraint load imposed on the shoulder belt 66 being divided between the roof mounted head rest 30 and the floor mounted seat 20. In particular, it will be recognized that the load on the seat belt acting forwardly and downwardly will pull the head rest 30 downwardly while at the same time lift the seat back 24 upwardly. Thus, the restraint load is effectively divided between the floor and the roof, thereby reducing the load which would otherwise be taken solely by either the head rest or the seat back.

Referring to FIG. 4, it is seen that the seat back 24 may be tilted forwardly to a position facilitating easy access to the rear seat. Upon such forward tilting movement seat belt 66 is unwound from the door mounted retractor 74, not shown, and slides through the slot 96 in the head rest. In this way, it will be understood that the seat belt 66 does not impede the forward tilting movement of the seat back. At the same time it will be appreciated that the shoulder belt 66 will function to tilt the head rest 30 to its full forward position, indicated by phantom line, to clear the head rest from obstruction of rear seat entry.

As best seen in FIG. 2, a plastic clip 102 may be attached to the wing 26 of the seat back and receives the shoulder belt 66 to guide and locate the shoulder belt relative to the seat.

Thus it is seen that the invention provides a new and improved vehicle seat, seat belt and head rest.

The embodiments of the invention in which an exclusive property or privilege is claimed are defined as follows:

1. In a motor vehicle body having an occupant seat movably mounted within an occupant compartment defined by a roof structure and a door, an occupant head restraint system comprising: a head rest having a frame and a cushion, pivot means mounting the head rest on the vehicle roof structure for forward and rearward movement, and connecting means extending between the seat and the head rest acting to pivot the head rest forwardly and rearwardly upon corresponding movement of the seat to establish the head rest at a location appropriate to the location of the seat.

2. In a motor vehicle body having an occupant seat movably mounted within an occupant compartment defined by a roof structure and a door, an occupant head restraint system comprising: a head rest having a frame and a cushion, pivot means mounting the head rest on the vehicle roof structure for forward and rearward movement, an occupant restraining shoulder belt having an upper end connected to the head rest and a lower end retractably mounted on the vehicle body by a locking retractor, said shoulder belt acting in response to movement of the seat to pivot the head rest forwardly and rearwardly upon corresponding movement of the seat to establish the head rest at a location appropriate to the location of the seat, said shoulder belt further acting upon locking of the shoulder belt locking retractor to tether the head rest against pivoting movement relative to the roof to thereby provide effective occupant head restraint.

3. In a motor vehicle body having an occupant seat movably mounted for forward and rearward adjusting movement within an occupant compartment defined by a roof structure and a door, an occupant head restraint system comprising: a head rest having a frame and a cushion, pivot means mounting the head rest on the vehicle roof structure and defining an axis for forward and rearward pivotal movement of the head rest, and a spiral spring having an inner end spiraled around the axis of the head rest pivot means, an intermediate portion passing slidably through the head rest, and an outer end attached to the seat, whereby upon forward and rearward movement of the seat, the spiral spring is wound and unwound from the head rest and the headrest is pivoted forwardly and rearwardly upon corresponding movement of the seat to establish the head rest at a location appropriate to the location of the seat.

4. In a motor vehicle body having an occupant seat movably mounted for forward and rearward adjusting movement within an occupant compartment defined by a roof structure and a door, an occupant head restraint system comprising: a head rest having a frame and a cushion, pivot means mounting the head rest on the vehicle roof structure and defining an axis for forward and rearward pivotal movement of the head rest, an occupant restraining shoulder belt having an upper end connected to the head rest and a lower end retractably mounted on the vehicle body by a locking retractor, and a spiral spring having an inner end spiraled around the axis of the head rest pivot means, an intermediate portion passing slidably through the head rest, and an outer end attached to the seat, whereby upon forward and rearward movement of the seat, the spiral spring is wound and unwound from the head rest and the headrest is pivoted forwardly and rearwardly upon corresponding movement of the seat to establish the head rest at a location corresponding to the adjusted position of the seat and upon locking of the shoulder belt locking retractor the shoulder belt tethers the head rest against pivoting movement relative to the roof to thereby provide effective occupant head restraint.

5. In a motor vehicle body having an occupant seat movably mounted on the floor within an occupant compartment defined by a roof structure and a door, an occupant head restraint system comprising: a head rest having a frame and a cushion and a slot extending transversely through the head rest, pivot means mounting the head rest on the vehicle roof structure for forward and rearward movement, an occupant restraining shoulder belt having a lower end retractably mounted on the vehicle body by a locking retractor and an upper end passing slidably through the transverse extending slot of the head rest and attached to the seat, said shoulder belt acting in response to movement of the seat to pivot the head rest forwardly and rearwardly upon corresponding movement of the seat to establish the head rest at a location appropriate to the location of the seat, said shoulder belt further acting upon locking of the shoulder belt locking retractor to tether the head rest against pivoting movement relative to the roof to thereby provide effective occupant head restraint and the occupant restraint load imposed on the shoulder belt being transmitted partly to the vehicle roof by the head rest and partly to the floor by the seat.

* * * * *